Aug. 14, 1945.     G. B. GREENE ET AL     2,382,709
RADIO DIRECTIONAL CONTROL SYSTEM FOR VEHICLES
Filed June 23, 1941     3 Sheets-Sheet 1
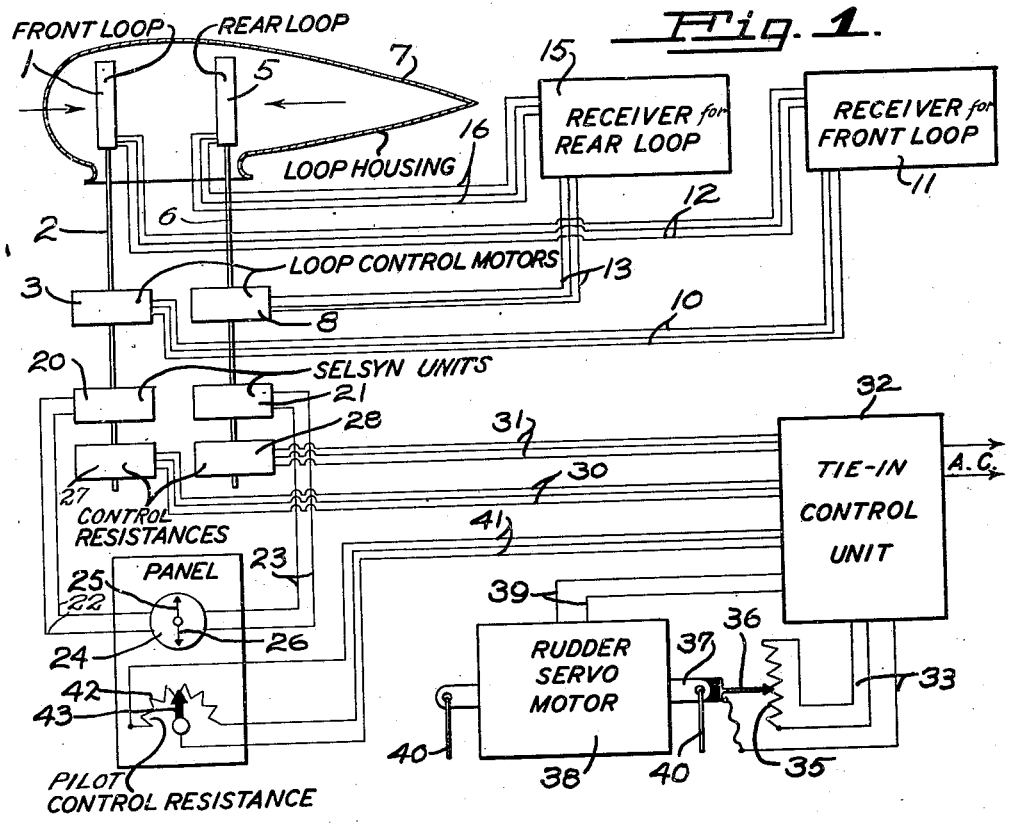
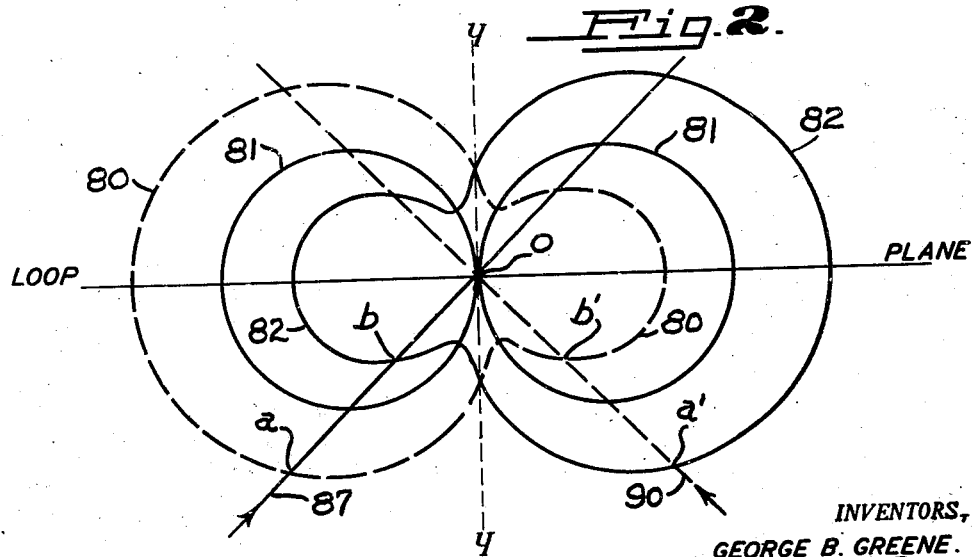
INVENTORS,
GEORGE B. GREENE.
RALPH W GOBLE.
BY Lippincott & Metcalf
ATTORNEYS.

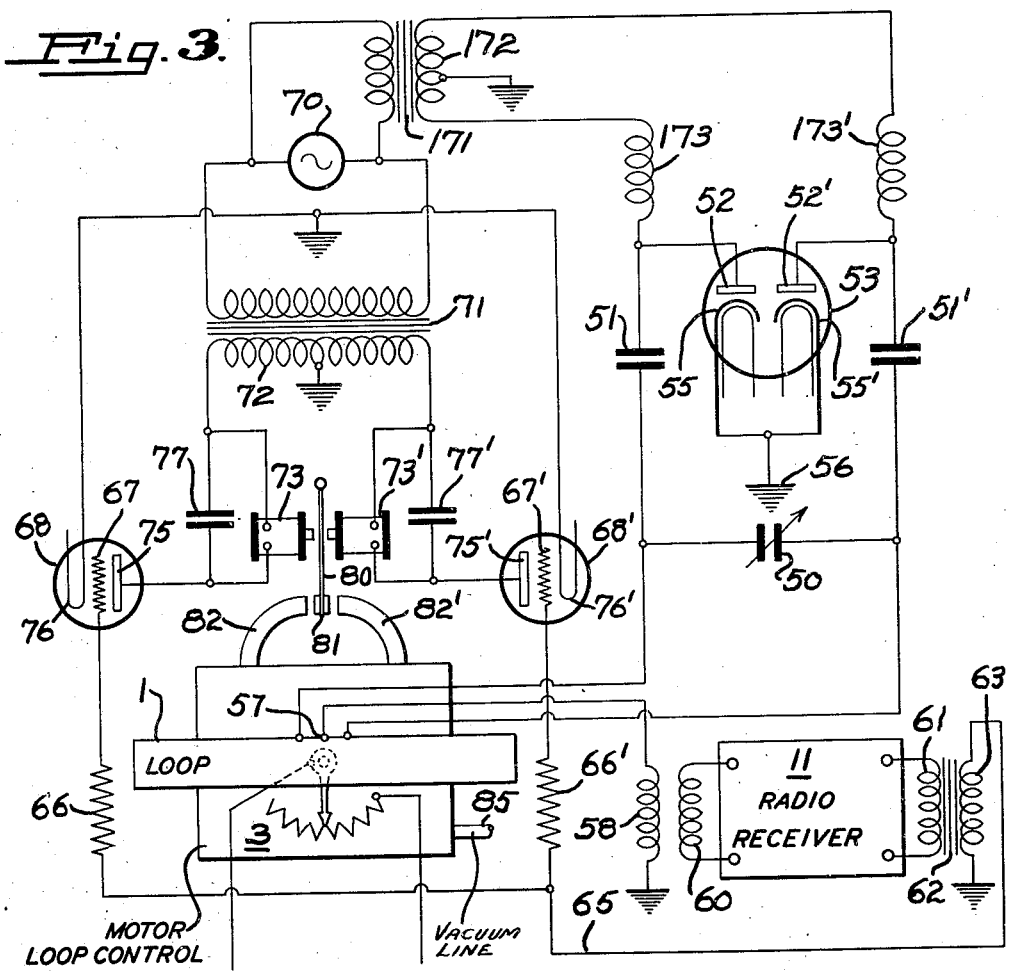

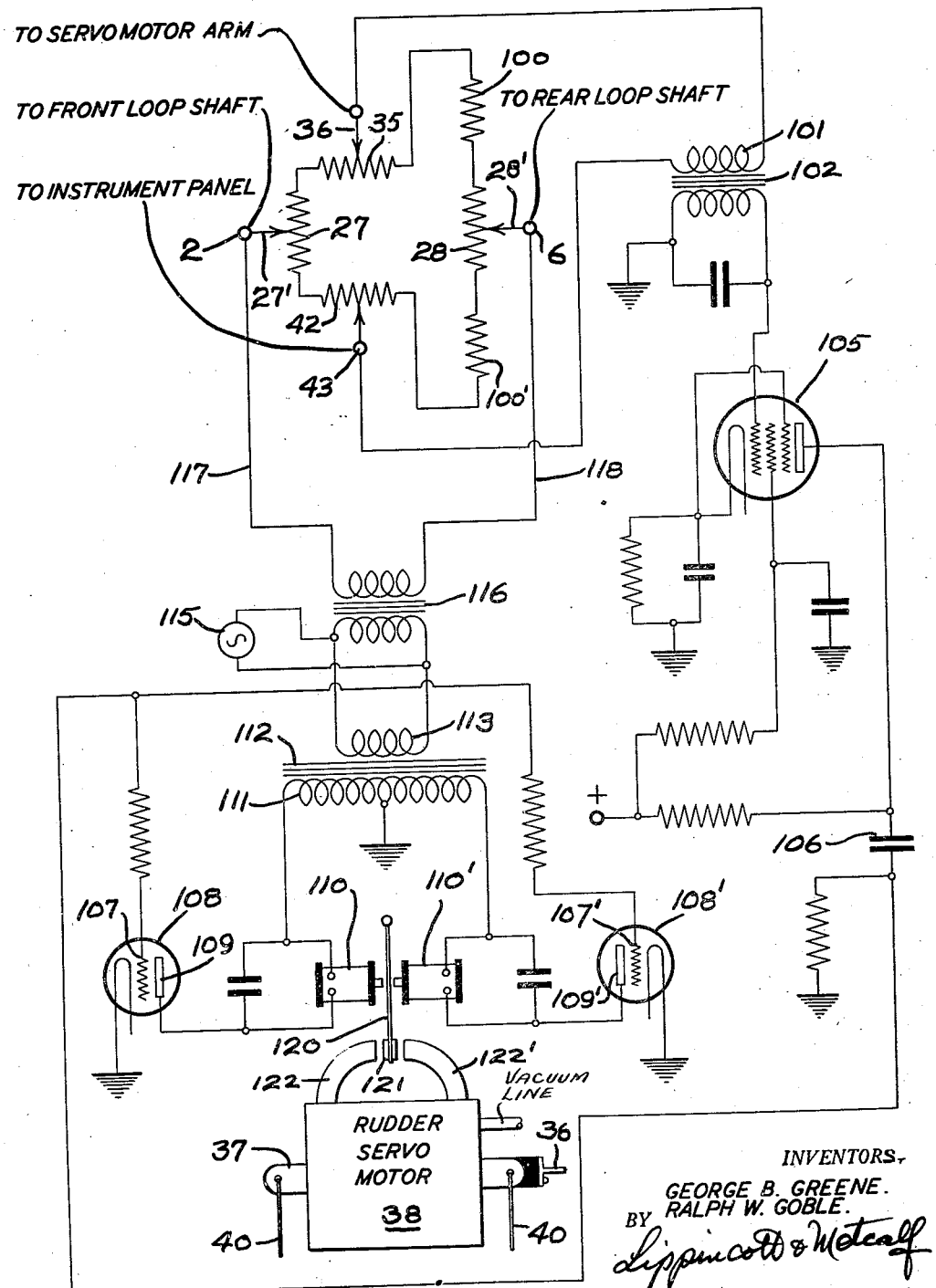

Patented Aug. 14, 1945

2,382,709

UNITED STATES PATENT OFFICE 2,382,709

RADIO DIRECTIONAL CONTROL SYSTEM FOR VEHICLES

George B. Greene and Ralph W. Goble, Long Beach, Calif.

Application June 23, 1941, Serial No. 399,326

20 Claims. (Cl. 250—2)

This invention relates to radio equipment for maintaining a vehicle on a predetermined course. While the invention herein described is primarily designed for the control and position determination of aircraft, it will be obvious to those skilled in the art that it is applicable to the control of any vehicle which may be deflected from a course by adverse forces, whether the vehicle be an airplane, an airship, or a surface vessel, on land or water.

Radio direction finders of the "homing coil" type have been well known for many years. More recently, these devices have been improved to give a visual indication as to whether the vehicle upon which the device is mounted is headed directly upon its course or to the right or left thereof. Direction finders of this latter type (right-and-left indicators) use received radio waves to develop electric currents which are effectively in one direction when the axis of the device is directed to the right of the wave source and in the other direction when the axis is directed to the left of the source, being zero when the axis of the direction finder is pointed directly toward the source of the waves. Such direction finders may be used merely to give an indication of right or left upon a center-zero meter, or a relay may be substituted for the meter and, upon relay operation to one side or the other of zero, setting thereof may be used to actuate the controls of the vehicle which in turn actuate the rudder thereof.

When this is done in the simple "homing coil" manner, the direction finder is usually mounted with its axis in a fixed position coincident with the axis of the vehicle, whereupon the system maintains the vehicle on an apparent course directly toward its destination or "home" station. The actual course may, however, be quite different. If, for example, a vehicle such as a plane be flown in accordance with the indications of such a directional control and a cross wind be blowing, the plane will eventually arrive at its destination, but it will do so by a circuitous route which may carry it over dangerous or unknown territory.

It is the purpose of this invention to avoid these difficulties, and to provide a radio directional control which will maintain a vehicle substantially upon a direct course irrespective of cross currents tending to deviate it therefrom; to provide a radio directional control which, when a vehicle is off a direct line between two radio transmitters emitting identifying signals, will operate the controls in such a manner as to direct the vehicle back to such direct line; to provide a directional control system which will so operate the directive mechanism of a vehicle as to come to an equilibrium with the vehicle upon its true course, i. e., to cause a vehicle such as a plane to "crab into the wind" to the necessary degree; to provide a directional control which will operate upon unmodulated waves, broadcast waves, or radio beacons, as may be desired; to provide a radio directional control which is sufficiently simple, light, and rugged to render its operation upon either commercial, military, or private aircraft economical and practical; and to provide a radio directional control system using rotatable loops mounted on a vehicle together with means for indicating the relative position of such loops, and for utilizing the relative position of said loops and said vehicle to control the vehicle.

Our invention is ideally adapted to fly a course between two radio transmitters, with one loop operating from a forward or "toe" station, and the other loop operating on a rear or "heel" station, in the manner set forth in the application of Goble and Phillips, Serial No. 314,854, filed January 20, 1940, granted June 24, 1941, as U. S. Patent No. 2,247,294 titled Radio directional control for aircraft.

The present invention differs from the device of the above cited patent in that the invention therein utilized fixed loops, each operating a radio receiver with the outputs of said radio receivers being electrically mixed to provide a control current operating a servo motor, which in turn operated the rudder of the aircraft. The present invention, in its preferred form, is in essence two completely automatic direction finders, comprising two rotatable loops, preferably in a common housing, together with their respective separate receivers and power supply. The two loops are automatic null-finding loops separately controlled by their respective receivers in such a manner that both of them are simultaneously indicating the null direction to one of the two transmitters, one of such transmitters being preferably in front of the craft and the other preferably in the rear thereof. The respective angular directions of the loops with respect to the airplane, may be indicated upon a suitable azimuth indicator wherein two indicating hands refer to a single navigation dial to give the transmitter positions with respect to the airplane. Thus the present device may be at the same time a duplex direction finder which may be operated as such, it can be utilized as a single direction finding unit, and if desired, as a communication receiver at the same time.

By indicating electrically as well as visually the loop positions, and by utilizing the movement of the loops to operate a bridge circuit, we are able to utilize the bridge circuit output currents to operate a servo motor controlling the rudder of a craft or vehicle, and by proper control of the bridge circuit by other factors, we are able to operate our invention strictly as a homing device where it will be relatively insensible to displacements from a straight line between two transmitters, yet be very sensible to yaw angles developed between the axis of the craft and the line between the craft and the leading transmitter.

The device, if desired, may also be operated as a device sensible only to displacement from the straight line course between the two transmitters, and yet be relatively insensible to yaw angles between the axis of the craft and the leading transmitter; or the device may be operated to give a blend of these two opposing characteristics.

The manner in which the device can be made to operate in these different manners will be more fully described later, and the advantages and disadvantages of each adjustment fully pointed out.

In the drawings:

Fig. 1 is a diagrammatic block unit circuit illustrating a system embodying our invention as applied to control of an airplane.

Fig. 2 is a polar diagram of the directional characteristic of a receiving system of the type used in our invention.

Fig. 3 is a circuit diagram of one null-finding loop together with its radio receiver and output circuits for controlling the loop.

Fig. 4 is a circuit diagram of a control circuit utilized to operate the rudder of an airplane utilizing our invention.

Considering in detail one preferred form of apparatus and circuit setup capable of performing our invention, reference is made first to Fig. 1 showing the general system layout for an airplane direction finder operating in accordance with our invention. Here a front loop 1 which is adapted to receive signals from a toe radio station in front of the airplane, is mounted on a shaft 2 in such a manner that the loop can be rotated by a front loop control motor 3. Directly to the rear of front loop 1 is a rear loop 5 adapted to receive signals from a rear station or heel station and mounted on a rear loop shaft 6 capable of being rotated. The signals from the toe-station should preferably differ from those of the heel-station. Both loops are preferably positioned within a streamlined loop housing 7 which may be mounted on the plane with the long axis of the housing parallel to the axis of the plane and preferably in the vertical plane passing through the longitudinal axis of the airplane. Rear loop shaft 6 is rotated by a rear loop control motor 8. Front loop control motor 3 is connected by motor control circuit 10 to front loop receiver 11, which is energized through input circuit 12 coming from front loop 1, and rear loop control motor 8 is connected by rear loop motor control circuit 13 to rear loop receiver 15, receiver 15 being energized by rear loop input circuit 16. Also mounted on the front and rear loop shafts 2 and 6 respectively, are "Selsyn" or follow-up units 20 and 21 respectively, which are connected by their respective electric circuits 22 and 23 to a panel navigation dial 24 of any desired type, circuits 22 and 23 operating indicating hands 25 and 26 which are operated by Selsyn followers positioned behind the dial as is well known in the art, to indicate the direction assumed by each loop. Flexible shafts may be used to move hands 25 and 26.

Also mounted in position to be varied by rotation of shafts 2 and 6, are control resistances 27 and 28 respectively, these resistances being connected by electrical circuits 30 and 31 to a tie in control unit 32, the circuit of which will be later described.

Also entering the control unit is a servo motor resistance circuit 33 under control of a resistance 35 varied by a movable contact 36 attached to the operating bar 37 of a rudder servo motor 38. From the operating bar 37 controls 40 go to the rudder of the airplane. The servo motor is actuated from the control unit through circuit 39.

A panel resistance circuit 41 also enters the control unit 32 under control of a resistance 42 varied by pilot control arm 43. Preferably the pilot control is mounted adjacent navigation dial 24, and within easy reach of the vehicle pilot.

This completes the general setup of the equipment for directional indication of the craft's course on the navigation dial 24, and for the automatic control of the airplane in accordance with the position of the two loops 1 and 5.

We refer next to Fig. 3 which shows a single loop and its associated receiver and loop control apparatus, and to Fig. 2 for the characteristic of the associated loop and receiver. Both loops and receivers are identical, so it is believed that the description of the front loop system will be sufficient. The loop control impulse is derived from a directional radio receiving system comprising front rotatable loop 1 as already described. The loop 1 is tuned by a variable condenser 50 to a radio wave transmitted from the destination of the airplane (toe station), and the two terminals of the loop are connected through blocking condensers 51 and 51' to the two anodes 52 and 52' of a double diode rectifier tube 53, the two cathodes 55 and 55' being connected together and to ground 56. A center tap 57 on the loop also connects to ground through the primary 58 of a radio frequency transformer whose secondary 60 feeds front loop radio receiver or detector amplifier combination 11 of conventional design. This receiver may be of the superheterodyne or tuned radio frequency type or any other sufficiently sensitive radio receiver. The output of the final detector of this receiver supplies the primary 61 of an audio-frequency output transformer 62. One end of the secondary 63 of the output transformer is connected to ground. The other end connects through a lead 65 to the neutral point of a split resistance 66 and 66', the ends of which energize the grids 67 and 67' of a pair of output tubes 68 and 68'. These two tubes may be either high vacuum amplifier tubes as shown, or they may be gaseous conduction tubes of the "gridglow" or "thyratron" type. In either event, their plate supply is alternating current supplied by an oscillator 70 through a transformer 71 whose secondary 72 is center-tapped and grounded and whose terminals connect through the opposed relay coils 73 and 73', to the output tube plates 75 and 75'. The filaments 76 and 76' are energized and connected in the usual manner. By-pass condensers 77 and 77' are preferably bridged across the relay coils to assist in the elimination of any components in the receiver output which are derived from the reception of modulated waves.

The coils 73 and 73' act in opposition against a common armature 80, which carries upon its end a valve member 81, so that the operation of the relay in either direction serves to close one or the other of a pair of air tubes 82 and 82' and thus actuate the loop control motor 3, which turns the loop 1 in one direction or the other, depending on which of the air tubes 82 and 82' is blocked by the valve 81.

Vacuum line 85 supplies energy for the loop control motor, which may be any type of conventional air motor continuously rotatable in either direction as determined by action of valve member 81. Electric or hydraulic motors are deemed full equivalents of the air motor.

The anodes 52 and 52' of the tube 53 are excited by alternating potential and current supplied by the A. C. source 70 through a transformer 171, the secondary 172 of which is center-tapped and grounded, and whose terminals connect to the anodes 52 and 52' through radio frequency choke coils 173 and 173'.

We may explain the operation of the loop mathematically by saying that when the loop 1 is receiving a radio signal of frequency $f$ a current whose magnitude is proportional to $$A \sin \theta (\sin 2\pi ft)$$

circulates in the loop circuit. Here A is a coefficient expressing the receiving ability of the loop, and $\theta$ is the azimuth of reception with respect to an arbitrarily assumed positive direction along the loop axis. If the loop be unbalanced with respect to ground, i. e., if one end of the loop be nearer to ground potential than the other, there will be added to the current due to the loop effect a current due to the "vertical antenna effect" (hereinafter abbreviated to "antenna effect") which is proportonal to $$\pm B \sin (2\pi ft + p)$$

where B is a reception coefficient depending upon the degree of unbalance of the loop and $p$ is the phase angle of the current due to the antenna effect with reference to the loop effect. The sign of the antenna effect current depends upon which end of the loop is closer to ground potential, and the magnitude of the phase angle $p$ depends upon a number of factors which include the tuning of the loop and the magnitude and nature of the impedance to ground which creates the unbalance. If the coefficient A and B are equal and the angle $p$ is zero, the resultant directional pattern will be a cardioid, but in practice this is difficult to achieve. B may be greater than A, which gives a pattern resembling a cardioid in form but tending toward the circular. If the antenna effect be smaller than the loop effect (A>B) a two lobed curve results which has clearly defined nulls only in the unusual case where the antena effect and loop effect currents are exactly in phase, i. e., where $p$ is zero.

Broken line curve 80 in Fig. 2 illustrates a typical form of directional pattern which is provided by grounding one end of the loop. Here the loop effect exceeds the antenna effect, and the angle $p$ of the formula is assumed to be 45°, which is reasonably representative of conditions met in practice. It is well known that the directional characteristic of a loop antenna, such as the loop 1 (if the loop be accurately balanced with respect to ground) is a figure eight pattern comprising two tangent circles, as is shown by the curve 81 of Fig. 2, i. e., its directional characteristic is a sine curve as shown in polar coordinates, the intensity of the current flowing in the loop being proportional to the sine of the angle of reception with respect to the axis of the loop.

The effect of the alternating potential applied to the anodes of the tube 53 is to ground the two ends of the loop alternately. When one anode, e. g., the anode 52, becomes positive, the path from this anode to its corresponding cathode 55 and ground becomes conductive, while at the same time, the anode 52' is negative, the path to its corresponding cathode 55' is non-conductive, and the corresponding end of the loop is effectively isolated from ground, giving the directional pattern shown by curve 80. An instant later the polarity of the source 70 reverses, reversing potentials on the anodes 52 and 52' and also reversing the asymmetry of the directional pattern, as is shown by the solid line curve 82 of Fig. 2.

The curves 80 and 82 may be taken to represent the current circulating in the loop circuit, the potential applied to the input tube of the radio receiver, or the average current flowing in the primary 61 of the output transformer of the radio receiver. If the received wave be unmodulated the average output current will be the total output current; if a modulated wave is being received the modulations will be superimposed upon the mean current flowing. If the two curves be considered from the point of view as representing the primary current in the transformer 62, this current will alternate between the values of the radii-vectors of the two curves when a wave is being received from a given azimuth. For example, if a wave is being received along the solid line 87 of Fig. 2, propagated in the direction indicated by the arrow, the current in the transformer primary 61 will be proportional to the intercept o—a on this line (between the origin and the curve 80), during the time when the anode 52 is positive, and will be proportional to the intercept o—b (between the origin and the curve 82) during the period when the anode 52 is negative and the anode 52' is positive. Since the current in the primary 61 is unidirectional, its alternating component will be proportional to the difference between the lengths of two intercepts, i. e., proportional to the length of the sector $a$—$b$ of the radius vector. It will be seen that for a wave arriving along the null axis Y—Y, the intercepts between the two curves and the origin are equal, and there will be no alternating component in the transformer 62 when an unmodulated wave is being received.

If, however, a wave is being received along the broken line 90 in Fig. 2 propagated in the direction indicated by the arrow, the current in the transformer primary will be proportional to the intercept o'—a' on line 90 (between the origin and curve 82), during the time when the anode 52 is positive, and will be proportional to the intercept o'—b' (between the origin and the curve 80), during the period when the anode 52 is negative and the anode 51 is positive. The currents in this case, however, through the primary 61, will be in the opposite direction to the currents passing through primary 61 for intercept $a$—$b$ between curves 80 and 81.

The currents passing through transformer 62, therefore, will vary in direction in accordance with the angular displacement of the loop on each side of the null axis and this variation in direction is utilized to operate the loop control motors.

Trigger tubes 68 and 68' are adjusted to operate just below their triggering points, by variation of bias voltage thereon when there is no alternating component in transformer 62. Consequently, if audio signals of strength sufficient to cause triggering are imposed on the bias voltage through line 65 one or the other of the tubes will become triggered in accordance with the direction of the currents through transformer 62, the tubes having a positive voltage superimposed on its bias voltage will trigger at the half cycle as the voltage is impressed on it by oscillator 70 through transformer 71. A pulsating current will then follow through the relay coil 73 or 73' in series with the anode of the triggered tube, causing the closing of one of the relays and rotation of the loop by the loop control motor, until the null axis is reached by the loop, whereupon no current will flow through output transformer 62, and no further loop rotation will occur. Obviously, however, some loop oscillation will occur, but this is common with all types of automatic control equipment and no harm will occur, as this oscillation, if it does occur, can be at least partly averaged in the rudder control circuit.

By using identical circuits attached to each loop 1 and 2, each loop will therefore constantly seek its own null position.

The rotational position of each loop is then transmitted via the Selsyn units 20 and 21 through Selsyn circuits 22 and 23 to operate the Selsyn receivers back of navigation dial 24, so that by observation of indicating hands 25 and 26, the position of the two loops and consequently their respective transmitting stations may be at all times observed with respect to the axis of the plane. Obviously this navigation dial may be calibrated in degrees of deviation, for purposes of visual navigation.

However, in addition to visual indication of the course of the plane, we prefer to utilize the varying loop positions to operate the rudder of the plane. This may be accomplished by the use of an A. C. bridge control circuit as shown in Fig. 4. It will be noted that in the description of Fig. 1, four potentiometer resistances have been listed, and these resistances have been shown diagrammatically in Fig. 4. The front loop shaft 2 operates a resistance 27 through arm 27'. The rear loop shaft 6 operates a rear loop resistance 28 through arm 28'. The rudder servo motor 38 operates the resistance 35 and the pilot control resistance 42 is operated from the instrument panel. These four resistances are connected together in series to form a bridge with lateral resistances 100 and 100' on each side of the rear loop resistance 28.

The output of the bridge is taken from the panel control arm 43 of the panel resistance 42 to one end of primary 101 of rudder control input transformer 102, the other end of the primary 101 being connected to arm 36 operating resistance 35 controlled by the servo motor arm 37. This output is amplified by an amplifier tube 105 of conventional design and leads through a blocking condenser 106 to trigger grids 107 and 107' of servo motor relay tubes 108 and 108', which may be tubes of the "thyratron" or trigger type. The anodes 109 and 109' of these tubes are connected through servo motor relay coils 110 and 110' and thence to center-tapped secondary 111 of A. C. supply transformer 112, the primary 113 of which is energized by an A. C. source 115, or if desired, from source 70 used for the loop control motors. A. C. source 115 also energizes, through a bridge transformer 116, front loop resistance arm 27' through line 117, and rear loop resistance arm 28' through line 118.

Transformer 112 is center-tapped so as to make opposite ends of the secondary oppostie in phase. Consequently relay tubes 108 and 108' will be operative 180° out of phase with each other. Relay coils 110 and 110' operate to move a servo motor armature 120 having on the end thereof a servo motor valve 121 closing vacuum lines 122 or 122' leading to rudder servo motor 38, in accordance with the direction of movement. Thus the vehicle rudder is operated.

Resistor 35 controlled by the servo motor arm 37 provides a follow-up system for the control surface. This is to say that for a given off-course position indicated by the position of control arms 27' and 28' with respect to each other and with respect to the airplane, only a given amount of angular displacement is permitted the servo motor before resistor 35 has changed in value sufficiently to rebalance the bridge and to stop further movement of the servo motor. Resistor 42, which is positioned on the instrument panel of the airplane, with control 43 available to the pilot is used as a compensator for drift, such that the illusion of two imaginary transmitters is created in such a position as to cause the homing characteristics of the composite control unit to be corrected up wind of the course so as to compensate for drift of the airplane in the down wind direction. This does not necessarily mean that a straight line course will not be possible without heed to the control of drift compensation by varying resistor 42, but rather the course will be a series of rum lines or a "saw-tooth" wherein the airplane slowly labors into the wind and rapidly drifts down wind. Since the amplitude of this "saw-tooth" course is in practice extremely small, for all practical purposes a straight line may still be flown, yet from a standpoint of passenger comfort and fuel efficiency, it is deemed feasible to provide this control for drift compensation so that in a steady cross wind the airplane is made to fly a crabbing course without the oscillation accompanying a "saw-tooth" course.

The extra resistors 100 and 100' on the ends of rear loop resistor 28 are ballast to provide a balanced bridge even though opposite resistors 27 and 28 are of different total resistance. The reason resistors 27 and 28 (operated by the front and rear loops respectively), are preferably made of different resistance is that a duplex device of this nature may be operated, as before stated, strictly as a homing device, which renders the air plane relatively insensible to displacements from a straight line between the two heel and toe transmitters, but which will be very sensible to yaw angles developed between the axis of the airplane and the line between the airplane and the leading transmitter. Operation under this classification has the major disadvantage of causing an airplane to fly any one of a family of cigar-shaped curves between two stations and any instant the airplane may be flying essentially parallel to, but considerably displaced from the desired straight line course.

The device may be also operated to be sensitive only to displacement from a straight line course between two transmitters, yet be relatively insensible to yaw angles between the axis of the airplane and the line between the airplane and the leading transmitter. This latter operation on the other hand cannot conceivably fly a parallel course and is stable only along a straight line between two stations, but has an annoying characteristic of causing an airplane to fly a series of oscillations from one side of the course to the other, in a manner closely resembling a sine curve, and to fly from one threshold of sensitivity to the other. The amplitude of this oscillation is apparently an envelope comprising the two acute angles radiated from the two transmitter stations, whose value is closely related to the sensitivity of the receivers, and whose breadth is the maximum in the center of the course and again whose maximum amplitude will be proportional to the distance between the two stations.

The device may be operated, however, as a blend of these two opposing methods and as a preferred compromise between the first two recited adjustments. If resistances 27 and 28 are of equal value and so arranged that the added angular displacement values of the two loop controlled resistances are additive, a strictly homing device of the nature of the first above recited characteristic will result. If the resistances 27 and 28 are of equal values and angular displacement values are made to be subtractive, a device of the second classification will result.

However, if the resistance 27 operated by the front loop, receiving signals from the leading station, is of twice the value of the rear resistance 28 and the respective control arms are so disposed that their angular displacement values are subtractive, the resulting device will be approximately a 50–50 blend of the above characteristics. In this manner the control effect of the system upon the airplane will be composed of two equal components, one of which is the angular displacement of the front loop with respect to the airplane. The other is proportional to the angle between the two loops irrespective of their angles with the axis of the airplane. Thus we have provided a device having half homing, and half displacement characteristics.

Resistor 35 which is driven by the rudder servo motor arm 37 as above described, lends a powerful stabilizing factor to the functioning of the bridge circuit in that the actual rudder displacement can be made proportional to the sum of the front loop displacement with respect to the airplane, plus the angle between the front and rear loops. As the airplane approaches the course from an off-course position, this sum will diminish and become zero, at which time the rudder angle also becomes zero and a point of inflexion appears on the curve of approach to the straight line course. This will occur when the heading of the airplane becomes such as to definitely cross course and the airplane will approach the course quite abruptly.

Then as the flight progresses beyond this direction, the airplane will reverse its turn and approach the straight line course on a tangent. With this system of flight and from a strictly analytical viewpoint, no complementary ambiguity or stability along a line at right angles to the true course can possibly exist; neither can the airplane be stable along the bisector of the angle made by one transmitter to the airplane to the other transmitter, such as has been experienced with other systems.

Mention has been made of the fact that oscillation of the loops may occur. However, the servo motor may be made to have a slower and smoother action to integrate the oscillation of the loops and to rebalance the bridge so that the average of the loop swings will become the indicated null. Anti-hunt devices may be used to control loop oscillation.

As regards the follow-up characteristics of the servo motor, we prefer to utilize an on-and-off type of servo motor so that when a turn is executed by the airplane at a rate slower than the servo motor will react, then the controlling motion of the servo motor will be an intermittent action wherein the servo motor overtakes the need for direction and will go out of action until a greater need for rudder develops, at which time it goes back into action in the same direction. This will give a square wave form of motion whose frequency will be proportional to the difference between the degrees per second of the angular velocity of the airplane and the angular velocity of the servo motor when operating at full speed in one direction.

It will be noticed that the outputs of the front and rear receiving systems in our device above described are not required to be electrically mixed and thus may be utilized as completely independent direction finders and as communication receivers.

While we have described the mixing circuit as being a bridge circuit under the control of the movement of the two loops and the movement of the rudder or rudder servo-motor, it will readily be appreciated by those skilled in the art that other mixing circuits embodying elements under the control of the loop movements and the rudder movement may be utilized to produce an angle between the rudder and the airplane axis which is proportional to the sum or difference (depending on the zone of operation) of the angle between one loop null axis and the axis of the plane, and the acute angle between normals to the null axes of both loops. For example, variable inductors can be operated by the turning of the loop and the turning of the rudder and the current mixed to produce the same result as described herein.

Furthermore, it should also be pointed out that many airplanes already have as installed equipment, means to trim the rudder of the craft. Consequently if such means are available the panel resistance 42 under the control of arm 43 can obviously be omitted, as this resistor has the equivalent action of a rudder trimming device.

It should also be pointed out that the angular velocity of the rudder can be made substantially proportional to the difference between the actual rudder position at any one instant and the position to which the rudder would become stabilized if no further action thereon were to be made, even though an on-and-off servo motor is utilized. The latter of course, has essentially a single speed of action. However, the time intervals in which action takes place and ceases to take place are one-half cycle intervals of 60 cycles A.-C., consequently the average motion for practical purposes will fairly represent the optimum motion.

We claim:

1. The method of controlling the steering means on a dirigible vehicle so as to maintain the latter substantially on a true course determined by a pair of substantially non-directional radio transmitters operating at spaced points on said course and emitting signals characteristic of each transmitter, said vehicle being provided with a pair of right and left indicating radio direction finder systems, each system including a directional element separately rotatable with respect to an axis of said vehicle, which comprises the steps of tuning each of said direction finders respectively, to receive signals from a different one of said transmitters, rotating each of said directional elements with the output of its associated direction finder system to a predetermined position with respect to the station transmitting the signal received by the direction finder system, creating a current in accordance with the position of both elements, and controlling the steering means with said modified current.

2. The method of controlling the steering means on a dirigible vehicle so as to maintain the latter substantially on a true course determined by a pair of substantially non-directional radio transmitters operating at spaced points on said course and emitting signals characteristic of each transmitter, said vehicle being provided with a pair of right and left indicating radio direction finder systems, each system including a directional element separately rotatable with respect to an axis of said vehicle, which comprises the steps of tuning each of said direction finders respectively, to receive signals from a different one of said transmitters, rotating each of said directional elements with the output of its associated direction finder system to a predetermined position with respect to the station transmitting the signal received by the direction finder system, creating a current in accordance with the position of both elements, selectively modifying said current to correct for drift, and controlling said steering means with said modified current.

3. The method of controlling the steering means on a dirigible vehicle so as to maintain the latter substantially on a true course determined by a pair of substantially non-directional radio transmitters operating at spaced points on said course and emitting signals characteristic of each transmitter, said vehicle being provided with a pair of right and left indicating radio directon finder systems, each system including a directional element separately rotatable with respect to an axis of said vehicle, which comprises the steps of tuning each of said direction finders respectively to receive signals from a different one of said transmitters, rotating each of said directional elements with the output of its associated direction finder system to a predetermined position with respect to the station transmitting the signal received by the direction finder system, creating a current in accordance with the position of both elements, developing forces from said current, applying said forces to correct the course of said vehicle, and modifying said current in accordance with the magnitude and sense of said correctional forces.

4. The method of controlling the steering means on a dirigible vehicle so as to maintain the latter substantially on a true course determined by a pair of substantially non-directional radio transmitters operating at spaced points on said course and at different carrier frequency, said vehicle being provided with a pair of right and left indicating radio direction finder systems, each system including a directional element separately rotatable with respect to an axis of said vehicle, which comprises the steps of tuning each of said direction finders respectively to receive signals from a different one of said transmitters, rotating each of said directional elements with the output of its associated direction finder system to a predetermined position with respect to the station transmitting the signal received by the direction finder system, creating a current in accordance with the position of both elements, developing forces from said current, applying said forces to correct the course of said vehicle, modifying said current in accordance with the magnitude and sense of said correctional forces and further modifying said current at will to correct for drift.

5. In a vehicle having a rudder and a mixing circuit having element values under separate control of a pair of radio direction finding elements, the method of operating of said circuit to cause said vehicle to traverse a course between a pair of spaced radio transmitters of different carrier frequency located on said course, comprising the steps of rotating said direction finding elements to indicate the respective directions of said transmitters, energizing said mixing circuit in accordance with the direction and extent of rotation of each of said elements, and controlling said rudder in accordance with the output of said mixing circuit.

6. Radio control apparatus for the steering means on a dirigible vehicle comprising a pair of directional antenna systems each system including a directional element mounted on and rotatable with respect to an axis of said vehicle, a receiver connected in each of said antenna systems, means for rotating each of said directional elements in accordance with the sign of the output of its associated receiver, to a position indicative of the direction of a front and rear radio transmitter respectively, a mixing circuit including means for energizing the same, means operated by the rotation of said directional elements to control the output of said mixing circuit in accordance with the extent and direction of rotation by said directional elements from time to time, and a servo-motor connected to the rudder of said vehicle and energized by the output of said mixing circuit to adjust said rudder in predetermined direction and extent in accordance with changes in the output of said mixing circuit brought about by such rotation of said directional elements.

7. Apparatus in accordance with claim 6 wherein said mixing circuit contains elements varied by the rotation of said directional elements, and a variable element connected to said servo motor under control thereof.

8. Apparatus in accordance with claim 6 wherein said mixing circuit contains elements varied by the rotation of said directional elements, a variable element connected to said servo-motor under control thereof, and another variable element having a manual control connected thereto.

9. Radio control apparatus for a dirigible vehicle having a rudder comprising a pair of directional antenna systems, each system including a directional element mounted on and rotatable with respect to an axis of said vehicle, a receiver connected in each of said antenna systems, means for rotating each of said directional elements in accordance with the sign and magnitude of the output of its associated receiver, to a position indicative of the direction of a front and rear radio transmitter respectively, a servo motor connected to said rudder, a mixing circuit controlled by the position of said directional elements and said servo motor, means for energizing said mixing circuit, and means for operating said servo-motor in accordance with the output of said mixing circuit.

10. Radio control apparatus for a dirigible vehicle having a rudder comprising a pair of directional antenna systems each including a directional element mounted on and rotatable with respect to an axis of said vehicle, a receiver connected in each of said antenna systems, means for rotating each of said directional elements in accordance with the sign and magnitude of the output of its associated receiver, to a position indicative of the direction of a front and rear radio transmitter respectively, a servo motor connected to said rudder to control the course of said vehicle, a mixing circuit having elements therein varied in accordance with the position of each of said directional elements, means rendering said servo motor responsive to the output of said mixing circuit, and an element in said mixing circuit connected to and varied in accordance with the position of said servo motor.

11. Apparatus in accordance with claim 10 wherein the elements varied by both directional elements are of equal value and wherein variations by said systems are additive.

12. Apparatus in accordance with claim 10 wherein the element varied by one directional element is of twice the value of the element varied by the other directional element, and wherein variations by said directional elements are subtractive.

13. Apparatus in accordance with claim 10 wherein the elements varied by said directional elements are equal in value and wherein variations by said directional elements are subtractive.

14. Apparatus in accordance with claim 10 wherein an additional element is provided in said mixing circuit variable at will.

15. The method of guiding substantially along a true course, a rudder controlled vehicle provided with a pair of right and left indicating radio directional finder systems, each including a directional element separately rotatable with respect to the longitudinal axis of said vehicle, said method comprising the steps of adjusting said direction finder systems respectively to receive signals from a pair of transmitters located at spaced points in line with the true course and emitting signals distinguishing each transmitter from the other, rotating each of said directional elements to point to a different one of said transmitters, indicating alinement of each of the directional elements on said vehicle with respect to such transmitter from which it receives its signal, and adjusting the rudder of said vehicle in accordance with the positions of said directional elements to produce an angle between the rudder and the longitudinal axis of the vehicle which is proportional to the sum or difference of the angle formed by said longitudinal axis and the transmitter indication line of one of said directional elements, and the acute angle formed by the normals to the station indication lines of both of said directional elements.

16. The method of guiding substantially along a true course, a rudder controlled vehicle provided with a pair of right and left indicating radio directional finder systems, each including a directional element separately rotatable with respect to the longitudinal axis of said vehicle, said method comprising the steps of adjusting said direction finder systems respectively to receive signals from a pair of transmitters located at spaced points in line with the true course and emitting signals distinguishing each transmitter from the other, rotating each of said directional elements to point to a different one of said transmitters, indicating alinement of each of the directional elements on said vehicle with respect to such transmitter from which it receives its signal, and controlling the rudder of said vehicle in accordance with the relative positions of said directional elements with respect to each other, and with respect to the position of one of said elements to the longitudinal axis of the vehicle.

17. The method of guiding substantially along a true course, a rudder controlled vehicle provided with a pair of right and left indicating radio directional finder systems, each including a directional element separately rotatable with respect to the longitudinal axis of said vehicle, said method comprising the steps of adjusting each of said direction finder systems respectively to receive signals from a different one of a pair of transmitters located at spaced points in line with the true course and emitting signals distinguishing each transmitter from the other, rotating each of said directional elements to a null signal position with respect to such transmitter from which it receives its signal, and adjusting the rudder of said vehicle in accordance with the positions of said directional elements to produce an angle between the rudder and the longitudinal axis of the vehicle which is proportional to the sum or difference of the angle formed by said axis and the transmitter indication line of one of said directional elements, and the acute angle formed by normals to the station indication lines of both of said directional elements.

18. In a radio directional control system for vehicles having directional guiding means such as a rudder or the like; a bridge network comprising a plurality of serially connected impedances, a connection from each of two oppositely disposed impedances in said bridge network to provide input terminals for said network, an adjustable connection associated with each impedance of another and oppositely disposed pair of impedances in said bridge network to provide output terminals for said network; a source of power connected to said input terminals; a pair of directional elements each rotatable with respect to the longitudinal axis of said vehicle to enable locating of said vehicle with respect to a pair of spaced transmitters in line with the desired route of travel of said vehicle; movable means connected to one of said adjustable connections and one of said directional elements to adjust said connection in accordance with the extent and direction of rotation of said rotatable directional element and unbalance said bridge network accordingly; corresponding means connected to said other adjustable connection and said other rotatable directional element to correspondingly adjust said other connection; and circuit means connected to said output terminals and responsive to the combined unbalancing effect of both of said rotatable directional elements on said bridge network for maneuvering said directional guiding means to ultimately restore said adjustable connections to their balancing positions on said bridge network as the vehicle approaches the desired route of travel.

19. Apparatus in accordance with claim 18 wherein the impedances to which said adjustable connections are made are of equal impedance value and wherein the adjustments of said connections by said rotatable directional elements are additive in their effect on the bridge network.

20. Apparatus in accordance with claim 18 wherein one of the adjustable impedances is of approximately twice the value of the other adjustable impedance and wherein the adjustments of said connections by said rotatable directional elements are subtractive in their effect on said bridge network.

GEORGE B. GREENE.
RALPH W. GOBLE.